Patented Aug. 14, 1945

2,382,056

UNITED STATES PATENT OFFICE 2,382,056

GLASS TRANSPARENT TO FAR ULTRAVIOLET

Harrison P. Hood, Corning, N. Y., assignor to Corning Glass Works, Corning, N. Y., a corporation of New York No Drawing. Application April 21, 1944, Serial No. 532,207

6 Claims. (Cl. 106—54)

This application is a continuation in part of my pending application Serial Number 403,072 filed July 18, 1941, and it relates to ultraviolet transmitting glass.

The primary object of the invention is to produce glass compositions having a substantial transmission at wave length 185 m$\mu$.

Another object of this invention is to produce in large tonnage a glass having good chemical stability, a relatively low thermal expansion coefficient to permit sealing with tungsten and a transmission of 1% or more in 1 mm. thickness for wave length 185 m$\mu$.

Another object is to improve the stability and blackening resistance of such glasses.

Heretofore interest has centered chiefly on glasses having relatively high transmission in the so-called therapeutic region of the ultraviolet in the neighborhood of 300 m$\mu$. For therapeutic purposes wave length 254 m$\mu$ of the mercury arc is injurious but it is useful for sterilization purposes, and special glasses have been produced which transmit this wave length. In general, the transmission of ultraviolet radiations depends upon the absence of absorbing impurties from the glass and since the effect of such impurities is less for the longer wave lengths, it is not difficult to attain the necessary degree of purity for transmission down to 254 m$\mu$ in large tonnage melting. However, the best of prior commercial glasses in 1 mm. thickness do not transmit more than about .5% of wave length 185 m$\mu$ which is emitted by the mercury arc and which possesses considerable ozonizing power, that is, converts oxygen to ozone. For some purposes a substantial percentage of wave length 185 m$\mu$ is essential. In the absence of a glass capable of transmitting wave length 185 m$\mu$ it has been necessary heretofore to employ fused silica and arcs enclosed therewith are known as "quartz mercury lamps." In view of the difficulty with which fused silica is fabricated into useful shapes, a softer glass suitable for such use is desirable. Although it is possible under laboratory conditions to produce glasses having a substantial transmission at 185 m$\mu$ by using especially purified materials and melting under ideal conditions, attempts to reproduce such glasses on a commercial scale under factory conditions have failed.

This invention is predicated on my discovery that certain critically composed borosilicate glasses of the general composition $R_2O$—$B_2O_3$—$SiO_2$ are particularly transparent to wave length 185 m$\mu$ if they contain 4%–10% of alumina. Without alumina these glasses as produced in large tonnage in tank furnaces using the purest commercial materials are substantially opaque to this wave length, yet under the same conditions and containing alumina they exhibit a transmission of 1% or more. In my pending application it was shown that compositions suitable for large scale production contain by analysis 50% to 65% $SiO_2$, 3% to 10% $R_2O$ (alkali metal oxide), 4% to 10% $Al_2O_3$, and the balance is substantially $B_2O_3$, the molecular ratio of $B_2O_3$ to $R_2O$ being preferably greater than 2. Compositions falling within this range were shown to have good chemical stability and low thermal expansion coefficients suitable for sealing with tungsten. It was further shown that when the silica is increased substantially above 65%, the transmission at 185 m$\mu$ is lowered and the glasses are difficult to melt. When the silica is decreased below 50% the glasses become chemically unstable and the expansion coefficients become increasingly higher. It is also important for best transmission that the alkali be maintained as low as is consistent with ease of melting and the molecular content of alkali should preferably be not greater than half the molecular content of boric oxide.

Now I have found that the stability of the new glasses and their resistance to blackening during use in a mercury vapor lamp can be improved by increasing the silica content somewhat above 65% and at the same time lowering the alkali content to maintain the transmission of wave length 185 m$\mu$. In order also to maintain the meltability of the glass, lithia is substituted for some of the soda. I have found also that the addition of a small amount of lime, say about 0.5% CaO is effective in further improving meltability by minimizing the presence of stones, cords and other glass faults. The new glasses in their improved scope therefore contain 50% to 70% $SiO_2$, 1% to 5% $R_2O$ (alkali metal oxides), 4% to 10% $Al_2O_3$, 20% to 40% $B_2O_3$, and, if desired, 0.1% to 1% CaO. In the new glasses the soda is preferably introduced as a fluoride and the finished glass contains by analysis substantial fluorine.

I have further found that, in addition to the coloring oxides known to cause absorption in the therapeutic region, certain white or colorless oxides heretofore considered harmless have specific absorption effects at 185 m$\mu$ and hence should not be present in substantial quantities. Such oxides include antimony oxide and zinc oxide. In general, those oxides which appear white at room temperature but which appear colored or tinted when heated will cause absorption of wave length 185 mµ. For example, a borosilicate glass melted reducingly under laboratory conditions using especially pure materials had a transmission in 1 mm. thickness of 23% at 185 mµ and 68% at 254 mµ. The same glass with the addition of 0.007% Sb₂O₃ had a transmission in 1 mm. thickness of 0.8% at 185 mµ and 60% at 254 mµ. When 0.007% ZnO, instead, was added to the glass, the transmission in 1 mm. thickness at 185 mµ was 21% and at 254 mµ was 74%. When the amount of zinc was increased to 0.5% ZnO, the transmission in 1 mm. thickness at 185 mµ was 0.9% and at 254 mµ was 77%. This effect of zinc and antimony in preventing transmission of wave length 185 mµ is particularly surprising in view of the prior practice of adding them in substantial amounts to ultraviolet transmitting glass batches to prevent discoloration of the glass by carbon when the batches contained carbon or were melted in graphite containers.

As pointed out above, those metals or oxides which have a visible coloring effect on glass or which cause absorption in the therapeutic region of the ultraviolet are also more or less effective in causing absorption of wave length 185 mµ. Hence in the production of my new glasses the content of such metals or oxides should be decreased to a minimum.

As an illustration of the effect of alumina on the transmission of borosilicate glasses according to my invention the following glasses were melted and tested, the batch materials comprising, for the silica, acid-washed pulverized quartz and, for the other ingredients, commercial materials of standard quality.

|  | I | II | III | IV |
|---|---|---|---|---|
|  | Percent | Percent | Percent | Percent |
| SiO₂ | 55 | 55 | 55 | 55 |
| Na₂O | 3.5 | 3.5 | 3.5 | 3.5 |
| B₂O₃ | 41.5 | 38 | 33.5 | 31.5 |
| Al₂O₃ |  | 3.5 | 8 | 10 |
| Transmission 1 mm. thick— |  |  |  |  |
| At 185mµ | 0.5 | 16 | 17 | 15 |
| At 254 mµ | 20 | 75 | 70 | 73 |

It will be noted that when alumina was absent the transmission at 185 mµ was only 0.5%, but when alumina was present the transmission at this wave length was 15% or better despite the fact that no other change was made in the batch and in the conditions of melting it.

Whether or not the action of alumina is a chemical or a physical action is not known, but it seems reasonable to assume that all glass forming oxides have specific absorption effects, however slight, for wave length 185 mµ. If the effect of a given or unit quantity of an oxide be designated its absorption factor, it is certain that the absorption factors of some oxides such as the known absorbents are very great, whereas the absorption factors of oxides such as silica, boric oxide, etc., must be very low. On this basis it follows that the absorption factor of alumina must also be very low and it is not impossible that alumina may form molecular combinations or complexes with other more potent oxides, thereby reducing the absorption factors of the latter. Whether or not this theory is correct, alumina is certainly unusual in its effect because other amphoteric oxides not only do not show such an effect but, on the contrary, seem to possess high absorption factors per se. Such, for example, is the case with zinc and antimony oxides as pointed out above.

A particularly important consideration relating to my invention is the fact that compositions falling within the limits of the field set forth above change during melting so that the analytical composition of the finished glass differs substantially from the composition as calculated from the initial batch. Such changes are influenced by the type of melting container employed and by the time and temperature of melting and probably are due largely to the high boric oxide content some of which tends to volatilize, especially if fluorine is present in the batch. The net result is a marked lowering of the boric oxide and increase of the silica over the calculated percentages. Therefore, such changes must be allowed for in calculating the initial batch, but any particular analytical composition can be obtained by first determining the effect of the melting conditions to be employed on any particular batch. The following analytical composition in weight percentage illustrates a particularly desirable glass according to my invention:

|  | V, Percent |
|---|---|
| SiO₂ | 61.7 |
| B₂O₃ | 25.1 |
| Al₂O₃ | 8.4 |
| Na₂O | 4.6 |

The above composition, resulting from melting in a tank furnace using the best of commercially available materials and exercising due care to prevent contamination of the glass during melting, has a transmission of 1 mm. thickness of about 5% to 10% at 185 mµ and about 80% at 254 mµ. It melts and fines fairly readily and has a good chemical stability and a thermal expansion coefficient of about .0₅45.

Another glass according to my invention, which has substantially the same transmission as that of the above composition and still better meltability and stability, has the following analytical composition:

|  | Percent |
|---|---|
| SiO₂ | 66.6 |
| B₂O₃ | 23.9 |
| Al₂O₃ | 5.4 |
| Na₂O | 2.2 |
| Li₂O | .6 |
| CaO | .4 |
| F | .9 |

I claim:

1. An ultraviolet transmitting glass which comprises essentially silica, boric oxide, alumina and alkali metal oxide, the silica being from 50% to 65%, the alumina from 4% to 10%, and the alkali metal oxide from 3% to 5%, the molecular ratio of boric oxide to alkali metal oxide being greater than 2 to 1, the percentage of alumina being not less than the percentage of alkali metal oxide, and the glass being substantially free from coloring oxides and oxides of zinc and antimony and having a transmission of at least 1% for wave length 185 mµ in one millimeter thickness.

2. An ultraviolet transmitting glass having an analytical composition of approximately 62% SiO₂, 25% B₂O₃, 8½% Al₂O₃, and 4½% of alkali metal oxide, the glass being substantially free from coloring oxides and oxides of zinc and antimony and having a transmission of at least 1% for wave length 185 mµ in one millimeter thickness.

3. An ultraviolet transmitting glass which comprises 50% to 70% silica, 4% to 10% alumina, 1% to 5% alkali metal oxide and 20% to 40% boric oxide, the molecular ratio of boric oxide to alkali metal oxide being greater than 2 to 1, the percentage of alumina being not less than the percentage of alkali metal oxide, the glass being substantially free from coloring oxides and oxides of zinc and antimony and having a transmission of at least 1% for wave length 185 m$\mu$ in one millimeter thickness.

4. An ultraviolet transmitting glass which comprises 50% to 70% silica, 4% to 10% alumina, 1% to 5% alkali metal oxide and 20% to 40% boric oxide, the molecular ratio of boric oxide to alkali metal oxide being greater than 2 to 1, the percentage of alumina being not less than the percentage of alkali metal oxide, the glass being substantially free from elements having colored oxides and elements the oxides of which become colored on heating, and having a transmission of at least 1% for wave length 185 m$\mu$ in one millimeter thickness.

5. An ultraviolet transmitting glass which comprises 50% to 70% silica, 4% to 10% alumina, 1% to 5% alkali metal oxide, 0.1% to 1% calcium oxide, and 20% to 40% boric oxide, the molecular ratio of boric oxide to alkali metal oxide being greater than 2 to 1, the percentage of alumina being not less than the percentage of alkali metal oxide, the glass being substantially free from coloring oxides and oxides of zinc and antimony and having a transmission of at least 1% for wave length 185 m$\mu$ in one millimeter thickness.

6. An ultraviolet transmitting glass having an analytical composition of aproximately 66.5% $SiO_2$, 24% $B_2O_3$, 5.5% $Al_2O_3$, 2.2% $Na_2O$, 0.6% $Li_2O$, 0.4% CaO, and 0.9% F, the glass being substantially free from coloring oxides and oxides of zinc and antimony and having a transmission of at least 1% for wave length 185 m$\mu$ in one millimeter thickness.

HARRISON P. HOOD.